United States Patent [19]
Fournier et al.

[11] Patent Number: 6,138,454
[45] Date of Patent: Oct. 31, 2000

[54] SELECTIVE CATALYST REDUCTION WIT POX REACTOR FOR ENGINE EXHAUST AFTERTREATMENT

[75] Inventors: Walter L. Fournier, Rochester; Christopher E. Borroni-Bird, Rochester Hills; Marc Lorelli, Farmington Hills, all of Mich.

[73] Assignee: DaimlerChrysler Corporation, Auburn Hills, Mich.

[21] Appl. No.: 09/215,795

[22] Filed: Dec. 18, 1998

[51] Int. Cl.$^7$ .......................................................... F01N 3/00
[52] U.S. Cl. .................. 60/286; 60/303; 60/288; 60/324
[58] Field of Search ............................. 60/274, 286, 303, 60/300, 292, 324, 304, 295, 288

[56] References Cited

U.S. PATENT DOCUMENTS

| | | |
|---|---|---|
| 3,757,521 | 9/1973 | Tourtellotte et al. ...................... 60/274 |
| 4,383,411 | 5/1983 | Riddel ....................................... 60/303 |
| 4,520,624 | 6/1985 | Kirota et al. .............................. 60/286 |
| 4,604,868 | 8/1986 | Nomoto et al. ........................... 60/286 |
| 4,622,810 | 11/1986 | Shinsei et al. ............................ 60/286 |
| 4,711,087 | 12/1987 | Kawamura ................................. 60/286 |
| 5,379,592 | 1/1995 | Waschkuttis .............................. 60/286 |
| 5,609,022 | 3/1997 | Cho . | |
| 5,771,683 | 6/1998 | Webb ........................................ 60/274 |
| 5,964,088 | 10/1999 | Kinugasa et al. ......................... 60/286 |

OTHER PUBLICATIONS

Presentation by Arthur D. Little, Inc. entitled "Application of POX Fuel Processor to Spark–Ignition Engines" presented to Chrysler Corporation on Feb. 26, 1997 (pp. 10, and 12–15).

*Primary Examiner*—Thomas Denion
*Assistant Examiner*—Binh Tran
*Attorney, Agent, or Firm*—Marc Lorelli

[57] ABSTRACT

An exhaust stream aftertreatment system that selectively reduces NOx emissions during lean-burn operation of an internal combustion engine is provided. The apparatus includes a partial oxidation reactor having a fuel source, an ignition device, and various values. The partial oxidation reactor is disposed in the exhaust pipe of automobile between the engine and the threeway catalyst. A light-off catalyst is provided adjacent to the engine, upstream from the partial oxidation reactor. The three-way catalyst and the light-off catalyst are typical automotive catalysts having a substrate plated with a precious metal to facilitate the oxidation of hydrocarbons (HC) and carbon monoxide (CO) as well as the reduction of nitrogen monoxide and nitrogen dioxide (NOx). The partial oxidation reactor is adapted to operate while the internal combustion engine is producing high levels of NOx or while the engine is operating in a lean burn regime.

2 Claims, 2 Drawing Sheets

SELECTIVE CATALYST REDUCTION WIT POX REACTOR FOR ENGINE EXHAUST AFTERTREATMENT

BACKGROUND OF THE INVENTION

1. Field of the Invention

The present invention relates generally to a system for controlling the exhaust emissions from an internal combustion engine and, more specifically, to a system for selectively reducing nitric oxides while the engine is operating in regimes that produce large quantities of nitric oxides. More specifically, but without restriction to the particular embodiment and/or use which is shown and described for the purposes of illustration, the present relates to a system for selectively reducing nitric oxides while the engine is operating in a lean burn regime.

2. Discussion of the Related Art

In recent years there has been an increase in the utilization of engines that have the ability to run in a lean-burn regime of operation, this is due to the inherently higher efficiency and hence lower carbon dioxide emissions during this type of operation. Internal combustion engines, both compression and spark ignition, burn various types of fuel with air and produce many species of products. The environmentally undesirable products have been attracting a great deal of attention. The typical exhaust stream of an internal combustion engine consists of appreciable quantities of the following chemical species: unburned hydrocarbons (HC), carbon dioxide ($CO_2$), carbon monoxide (CO), nitrogen ($N_2$), nitrogen monoxide (NO), nitrogen dioxide ($NO_2$) and un-reacted oxygen ($O_2$). Modern automobiles are equipped with catalytic converters that function to reduce the amounts of undesirable species, namely, $NO_2$, NO, HC, and CO. $NO_2$ and NO are both commonly referred to as NOx.

Internal combustion engines, in an effort to become more efficient, are attempting to implement lean-burn cycles. During low power demands on the engine, the engine runs lean, meaning that there is a less than a stoichiometric amount of fuel for the amount of air present. This concept increases engine efficiency by consuming less fuel. Unfortunately, this regime leads to the increased production of NOx by-products. NOx by-products are formed during the high temperature reaction between nitrogen and oxygen. It is difficult to eliminate this condition in the periods of lean-burn operation, due to the fact that excessive amounts of both oxygen and nitrogen will be present when an engine is running lean.

The traditional method of treating exhaust pollutants is to employ some type of catalysis system. The typical catalysis in today's automobile engine is designed to treat HC, CO, and NOx. This type of catalyst is termed a three-way catalyst. Most catalysts utilize precious metals deposited on a substrate. The most common precious metals employed in automotive catalytic converters are platinum, palladium, and rhodium. During lean operating conditions this type of catalyst does an adequate job facilitating the following oxidation reactions:

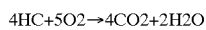
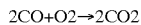

These reactions are easily preformed due to the excessive amounts of O2 available during a lean-burn type of operating condition. The difficulty in the lean burn regime is dealing with the reduction of NOx. This is a basic chemistry problem that has been facing the automotive industry for many years. A great deal of time and research has been devoted to developing a lean NOx catalyst. Currently, lean NOx catalysts have a lower operating temperature than the conventional catalyst that aids in the oxidation of HC and CO making lean NOx catalysts incompatible with automotive aftertreatment systems. Lean NOx catalysts have not been able to selectively reduce NOx to a level that is acceptable to the automotive industry.

There is, therefore, a need to provide to selectively reduce NOx while an engine is operating in a lean burn regime.

SUMMARY OF THE INVENTION

Accordingly, it is an objective of the present invention to provide a system which selectively reduces NOx during lean-burn operating conditions of an internal combustion engine.

In accordance with the teachings of the present invention, a combination three-way catalyst and a partial oxidation reactor that selectively reduces NOx emissions during lean-burn operation of an internal combustion engine is provided. The apparatus includes a partial oxidation reactor having a fuel source, an ignition device, and various values. The partial oxidation reactor is disposed in the exhaust pipe of automobile between the engine and the three-way catalyst. A light-off catalyst is provided adjacent to the engine, upstream from the partial oxidation reactor. The three-way catalyst and the light-off catalyst are typical automotive catalysts having a substrate plated with precious metal to facilitate the oxidation of hydrocarbons and carbon monoxide as well as the reduction of nitrogen monoxide and nitrogen dioxide. The partial oxidation reactor is adapted to operate while the internal combustion engine is producing high levels of NOx or while the engine is operating in a lean burn regime.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
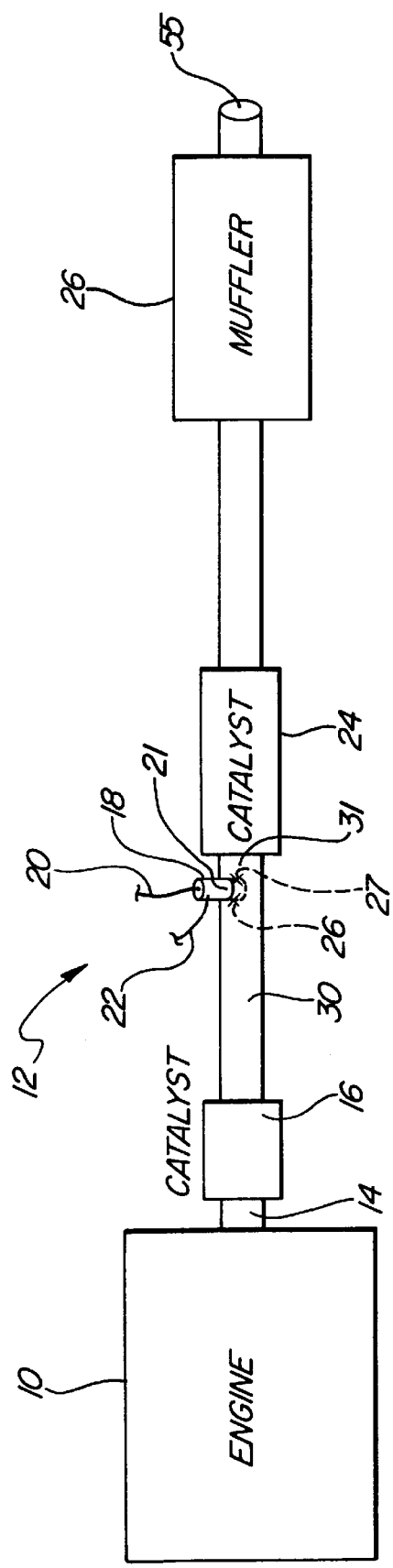
FIG. 1 is a schematic view illustrating an automotive engine and aftertreatment system.
Figure 1A:
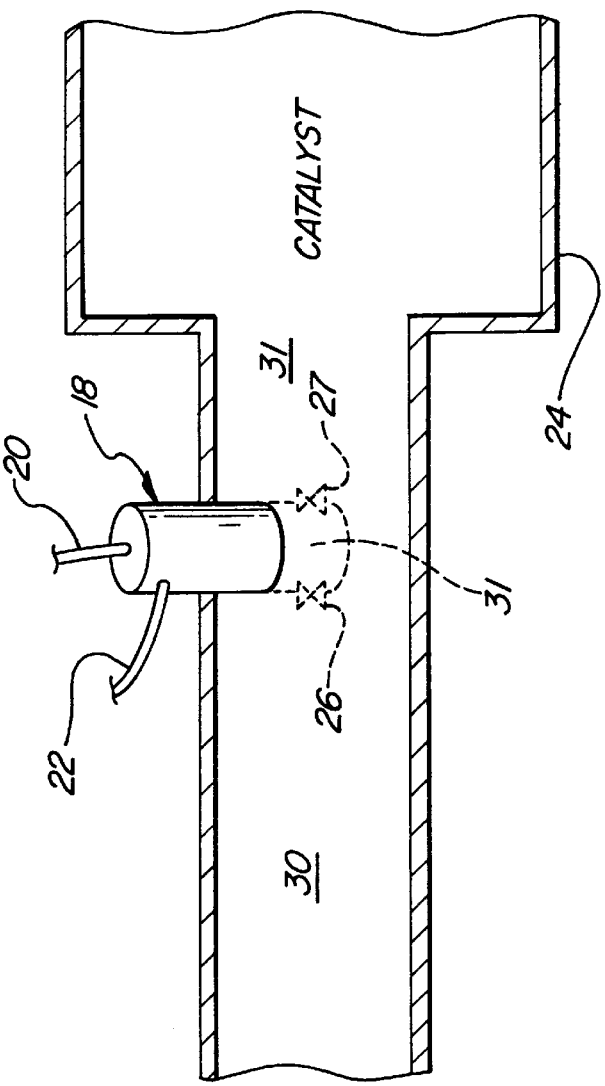
FIG. 1A is a magnification of a portion of FIG. 1.

Turning to FIG. 1, an internal combustion engine 10 and an aftertreatment system 12 is shown. Internal combustion engine 10 combusts hydrocarbon based fuel in a cylinder arrangement of some sort. Engine 10, typically either a spark or compression ignition engine, can combust a wide range of fuels. This combustion creates tremendous amounts of heat in addition to the following combustion products: unburned hydrocarbons (HC), carbon dioxide ($CO_2$), carbon monoxide (CO), nitrogen ($N_2$), nitrogen monoxide (NO), nitrogen dioxide ($NO_2$) and un-reacted oxygen ($O_2$). Exhaust stream 14 consists of appreciable amounts of the aforementioned combustion products. Aftertreatment system 12 is equipped with light-off catalyst 16 that is located in close proximity to engine 10. Light-off catalyst 16 reaches operating temperature substantially quicker than a catalyst placed downstream due to the heat of the combustion products and the heat rejection of the engine itself. As a catalyst increases in temperature, its efficiency increases substantially; thereby, reducing emissions. It is known to situate a three-way type catalyst near the exhaust valves of an internal combustion engine to decrease startup emissions. Next in line downstream of the light-off catalyst 16 is a partial oxidation reactor 18 that includes its own fuel source 20 and ignition means 22. Typically, a partial oxidation reactor consists of a small chamber in which fuel is ignited with only a scare amount of oxygen. Such a reaction produces substantial amounts of hydrogen gas $H_2$ and CO as its main products. Immediately following partial oxidation reactor 18 is another three-way catalyst 24. Catalyst 24 is, for purposes of this disclosure, essentially the same as light-off catalyst 16. Following three-way catalyst 24 is a muffler 26 or some other type of sound deadening component before the exhaust stream 55 exits to the environment.

Figure 2:
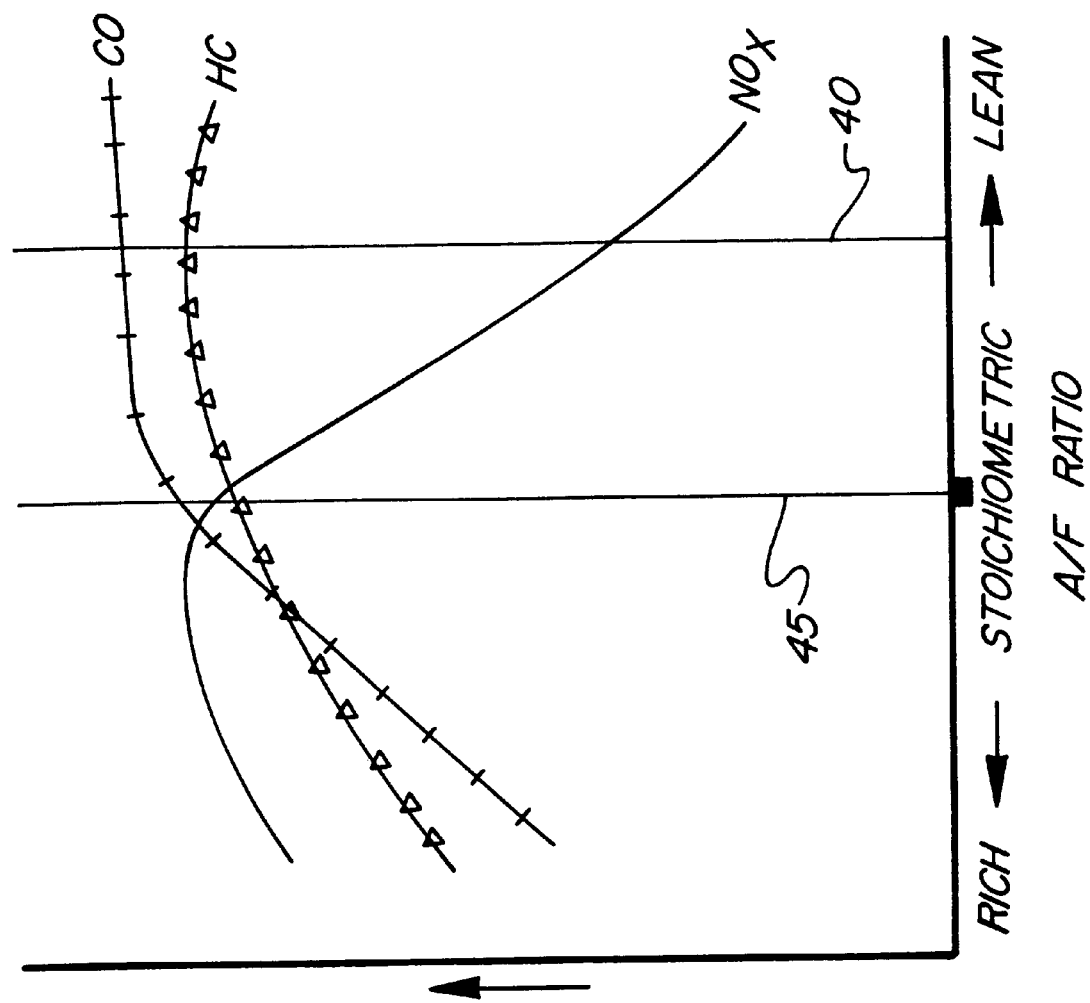
FIG. 2 is a graph illustrating the typical conversion efficiencies for a typical three-way catalyst with the air to fuel ratio introduced to a internal combustion engine.

Turning to FIG. 2, a graph illustrating the typical conversion efficiencies of a three-way catalyst at operating temperature is shown. As is known, it is beneficial to run an engine lean, that is, with a higher air to fuel ratio than stiochiometric. Running an engine lean during certain regimes of operation reduce fuel consumption. Conversion of HC and CO is acceptable in a catalytic converter during a lean burn cycle of the engine. Lean burn cycles are, however, restrictive due to the poor NOx conversion efficiencies in a typical catalytic converter.

Lean operation, identified as numeral 40 for illustrative purposes, is characterized by a combustion reaction that has excess oxygen compared to the $O_2$ that would be needed to stiochiometrically satisfy the following chemical equation.

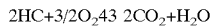

$2HC+3/2O_2 \to 2CO_2+H_2O$

During normal operation 45 of the engine, i.e. when the engine is operating with stiochiometric proportions of air and fuel, the present system operates with the partial oxidation reactor off. This would be essentially identical to the aftertreatment system in many modern internal combustion engine vehicles. The control strategy in many internal combustion engines is to run at stiochiometric proportions due the effectiveness of the three-way catalyst in that situation. The two catalysts 16, 24 both operate to effectively reduce all three current government regulated exhaust gases: NOx, CO, and HC. If the engine were to operate in a lean burn regime, HC and CO would continue to be effectively oxidized to $CO_2$, but NOx would not be effectively reduced to $N_2$ and $O_2$. This situation would produce excessive amounts of NOx, thereby limiting the range of lean burn capability available to designers of engine control algorithms.

The present invention provides a system by which NOx may be effectively reduced to $N_2$ and $O_2$ without compromising the oxidation of HC and CO while engine 10 is operating in a lean burn regime. To most effectively oxidize HC and CO in a catalytic converter, sufficient oxygen must be present to act as an oxidizing agent. By running the engine lean there will be sufficient amounts of oxygen entering the light-off catalytic converter 16. The light-off catalyst 16 will sufficiently oxidize HC and CO, but will do a poor job in reducing NOx as evidenced in FIG. 2. As the exhaust stream 30 nears the partial oxidation reactor and the second three-way catalyst 24 it contains sufficient amounts of NOx.

A partial oxidation (POx) reactor 18 is disposed immediately before catalyst 24. POx reactor 18 consists of a small cylinder 21 with a fuel source 20 and an ignition source 22 attached thereto. Fuel source 20 consists of gasoline or some other combustible hydrocarbon. Ignition source 22 consists of a glow plug or the like. Fuel is injected into cylinder 21 such that the fuel ratio is extremely rich, so as to produce mainly CO and H2 as products. After the ignition source 22 is activated the products in chamber 21 are allowed to mix with exhaust stream 30 using a valving system comprised of two valves 26, 27. Valve 26 and exit valve 27 open at the same time to allow exhaust to flow through chamber 21, thereby mixing the hydrogen rich products of the POx reaction with the exhaust stream to form a shifted exhaust stream 31. Thereafter, valve 26 is closed and exit valve 27 is closed shortly after the closing of valve 26. The fuel source 20 can then be activated as well as the ignition source 22 to begin the POx reaction over again in a manner as previously described. Cycles of the POx reaction may be preformed quickly so as to create an almost continuous source of $H_2$ to exhaust stream 30. One can appreciate that a highly hydrogenated fuel source will provide an even more efficient hydrogen source. Hydrogen acts a reducing agent for the NOx entering the second catalyst 24, which will increase the conversion of NOx considerably. This will allow the engine to operate in a lean burn regime without emitting excessive NOx into the atmosphere. One can appreciate that the above invention will also provide benefit in any regime of engine 10 produces high amounts of NOx.

It is known to provide a POx reactor in the intake stream of an internal combustion engine. This provides a hydrogen rich intake of fuel that combusts cleaner than typical gasoline. It is also known to provide a POx reactor upstream of a catalyst for providing a hydrogen rich exhaust gas while the catalyst is heating up to operating temperature. After the catalyst reaches operating temperature, the POx reactor does not operate. The present invention provides a POx reactor disposed between two catalytic converters, with a POx reactor located therebetween. The POx reactor functions to provide hydrogen rich gas to the exhaust stream while the engine is either in a lean burn cycle or while the engine is producing high levels of NOx.

While the above description constitutes the preferred embodiment of the invention, it will be appreciated that the invention is susceptible to modification, variation, and change without departing from the proper scope or fair meaning of the accompanying claims.

What is claimed is:

1. An aftertreatment system for treating exhaust gas in an exhaust stream from an internal combustion engine, said aftertreatment system comprising:

a first catalyst disposed downstream from the internal combustion engine;

a second catalyst disposed downstream from said first catalyst; and a partial oxidation reactor disposed between said first and second catalyst; said partial oxidation reactor produces hydrogen rich products from a partial oxidation reaction, wherein said partial oxidation reactor includes a valving system, said valving system includes an inlet valve and an exit valve, said inlet valve can be opened selectively to allow the exhaust gas to flow into said partial oxidation reactor, said exit valve is opened selectively to allow said hydrogen rich products to mix with the exhaust stream in the aftertreatment system .

2. The aftertreatment system as set forth in claim 1, wherein said partial oxidation reactor includes a fuel source connected thereto, said fuel from said fuel source and said exhaust gas that flows into said partial oxidation reactor through said inlet valve react in said partial oxidation reactor to produce said hydrogen rich products.

\* \* \* \* \*